UNITED STATES PATENT OFFICE.

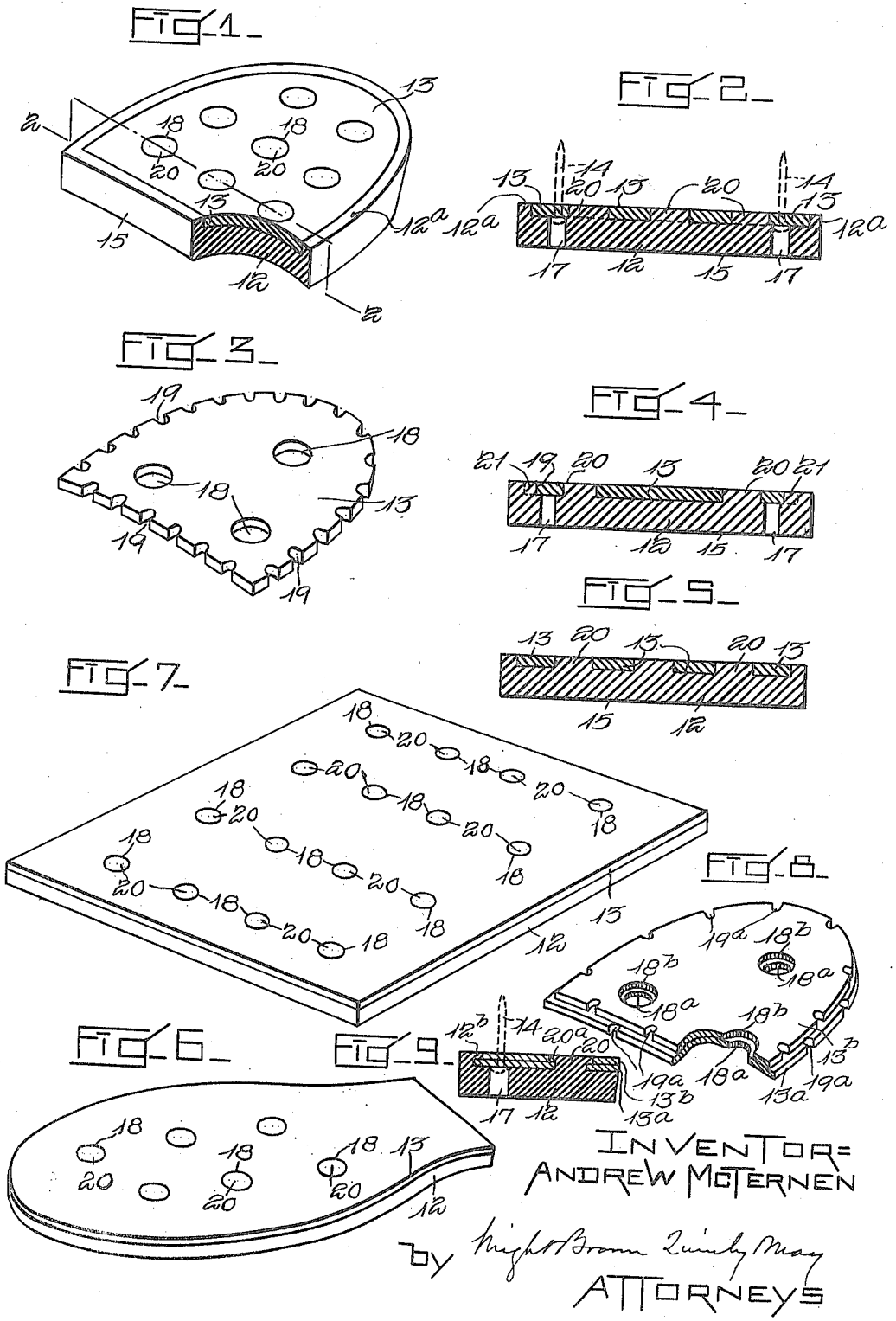

ANDREW McTERNEN, OF ANDOVER, MASSACHUSETTS.

RUBBER TREAD FOR FOOTWEAR.

1,206,346.  Specification of Letters Patent.  Patented Nov. 28, 1916.

Application filed July 11, 1916. Serial No. 108,719.

*To all whom it may concern:*

Be it known that I, ANDREW MCTERNEN, a citizen of the United States, residing at Andover, in the county of Essex and State of Massachusetts, have invented new and useful Improvements in Rubber Treads for Footwear, of which the following is a specification.

This invention relates generally to so-called rubber treads, such as are secured by nails to leather shoe heels and soles, the tread being composed of a vulcanizable composition which is plastic and inert before vulcanization, and, when vulcanized, is resilient and relatively soft or yielding and forms a suitable cushion.

The invention relates in particular to a rubber tread of this character, when provided with a member of semi-hard vulcanizable material embedded in its body, to engage the heads of the attaching nails, and it has for its object to provide an improved construction looking to a firm and practically inseparable union between the soft rubber body and the semi-hard nail-head-engaging member.

The invention is embodied in the improvements which I will now proceed to describe and claim.

Of the accompanying drawings forming a part of this specification: Figure 1 represents a perspective view of a heel tread embodying my invention, one corner being broken away and shown in section; Fig. 2 represents a section on line 2—2 of Fig. 1; Fig. 3 represents a perspective view of the nail-head-engaging member having openings both in its body and in its edges formed to engage anchoring portions of the tread body; Fig. 4 represents a view similar to Fig. 2, having a member formed as shown by Fig. 3; Fig. 5 represents a view similar to Fig. 2, the nail-receiving orifices in the soft rubber body being omitted; Fig. 6 represents a perspective view of a sole tread embodying the invention; Fig. 7 represents a perspective view of a blank from which a plurality of treads embodying the invention may be cut by a die or dies; Fig. 8 represents a perspective view of a nail-head-engaging member composed of two pieces or layers; Fig. 9 represents a fragmentary sectional view showing a heel having the two-part nail-head-engaging members shown by Fig. 8.

The same reference characters indicate the same or similar parts in all the views.

Referring to Figs. 1 and 2, 12 represents the body of a rubber tread composed of a suitable vulcanizable composition which when vulcanized is resilient and relatively soft to form a desirable cushion when attached to a leather heel.

13 represents a nail-head-engaging member composed of a suitable vulcanizable composition, which when vulcanized, is relatively hard and possesses a sufficient degree of density and tensile strength to enable its under side to adequately support the heads of attaching nails 14, the member being penetrable by the points of said nails so that it requires no nail holes.

A suitable composition for the member 13 may be made by mixing the following ingredients in the proportions specified: crude rubber, one pound; reclaimed rubber, seven pounds; cotton fiber, four pounds; asbestine, three pounds; litharge, one and one-half pounds; sulfur, one half pound; lampblack, one half pound; mineral rubber, one pound.

The member 13 made from said composition or any other suitable composition is spaced from the tread face 15 of the body 12 by a relatively thick cushioning portion of said body, the edges of the member being preferably covered by marginal portions of the body forming a flange 12$^a$. In practice, the member 13 may be pressed into the body while the latter is inert, the member being of smaller area than the body.

The cushioning portion of the body may be provided with nail-receiving orifices 17, as shown by Fig. 2, although these may be omitted if desired, as shown by Fig. 5, since the nails may be driven arbitrarily into the tread face and through the tread without careful predetermination as to location.

The member 13 is provided with orifices 18 constituting molds adapted to form anchoring studs 20 integral with the body, said studs adhering firmly to the walls of the orifices when the tread is vulcanized. I prefer to also provide notches 19 in the edges of the member 13, as shown by Fig. 3, said notches receiving anchoring portions 21 of the body, as shown by Fig. 4. The pressure exerted on the tread before vulcanization forces portions of the body composition through the orifices 18 and into the notches 19.

When the described parts have been assembled and vulcanized in a suitable mold, they are firmly united and constitute a tread having a soft elastic cushioning portion and a relatively hard and tough nail-head-engaging portion.

Treads embodying the invention may be cut by dies from a laminated sheet of indeterminate area, shown by Fig. 7, said sheet including a body 12 and a nail-engaging member 13. In a tread thus produced the edges of the nail-engaging members form parts of the edges of the tread.

Fig. 6 shows a sole tread embodying the invention, which may be cut from a laminated sheet, or formed independently like the heel tread above described.

The sole tread shown by Fig. 6 may be attached to a leather sole by nails the heads of which are engaged by the member 13.

The nail-head-engaging member may be composed of two pieces or layers 13$^a$ and 13$^b$, as shown by Figs. 8 and 9. The orifices 18$^a$ of the inner layer 13$^a$ are smaller than the orifices 18$^b$ of the outer layer 13$^b$, so that the walls of the molds formed by said orifices when the layers are assembled are stepped or rabbeted to form heads or flanges 20$^a$ on the studs 20, as shown by Fig. 9. The area of the inner layer is preferably greater than that of the outer layer, so that the member formed by the assembled layers has a stepped or rabbeted margin, causing the formation of a hooked marginal flange 12$^b$ on the body 12. The flanges 20$^a$ and 12$^b$ overhang portions of the inner layer and contribute materially to the strength of the union between the heel body and the nail-head-engaging member.

The layers 13$^a$ and 13$^b$ are united to each other by vulcanization. The edges of said layers may also be provided with notches 19$^a$, and the notches in one layer may be out of alinement with those of the other layer, as shown by Fig. 8.

Having described my invention, I claim:

1. A rubber tread for foot wear, comprising a relatively soft and elastic body of vulcanized material having a bottom tread face and a top face, and a relatively hard nail-engaging member of vulcanized material seated on said top face, united to the latter by vulcanization, and provided with holes, the said body being provided with integral anchoring studs equal in height to the thickness of the said member and united by vulcanization to the margins of said holes to provide an additional practically positive union between the said body and member and permit the said member to be located wholly at one side of said body.

2. A rubber tread for foot wear, comprising a relatively soft and elastic body of vulcanized material having a tread face and integral anchoring studs on its opposite face, and a relatively hard nail-engaging member of vulcanized material spaced by a portion of the body from said tread face, and composed of two superimposed layers having coinciding orifices of different areas and collectively constituting stepped holes receiving said anchoring studs, the contacting surfaces of said body and its studs and the corresponding surfaces of the nail-engaging member including the stepped margins of the holes therein being united by vulcanization.

3. A rubber tread for foot wear, comprising a relatively soft and elastic body of vulcanized material having a tread face and integral anchoring studs on its opposite face, and a relatively hard nail-engaging member of vulcanized material spaced by a portion of the body from said tread face, and composed of two superimposed layers having coinciding orifices forming holes receiving the anchoring studs, one of said layers being of larger area than the other to form a stepped margin.

In testimony whereof I have affixed my signature.

ANDREW McTERNEN.